United States Patent [19]

Fearing et al.

[11] Patent Number: 4,497,321
[45] Date of Patent: Feb. 5, 1985

[54] EAR TAG APPLICATORS

[75] Inventors: D. Michael Fearing, St. Paul; George N. Johnson, Stillwater, both of Minn.

[73] Assignee: Fearing Manufacturing Co., Inc., St. Paul, Minn.

[21] Appl. No.: 383,573

[22] Filed: Jun. 1, 1982

[51] Int. Cl.³ .............................................. A01K 11/00
[52] U.S. Cl. ...................................... 128/330; 29/268
[58] Field of Search ........................ 128/330; 119/135; 40/300–302; 72/409–410; 29/400, 268

[56] References Cited

U.S. PATENT DOCUMENTS 4,120,303 10/1978 Villa-Massone et al. ............ 128/330
4,121,591 10/1978 Hayes ................................. 128/330

FOREIGN PATENT DOCUMENTS 2308877 8/1974 Fed. Rep. of Germany ........ 40/301
2428394 2/1980 France ................................. 128/330
2464643 4/1981 France ................................. 128/330
161515 4/1921 United Kingdom ................ 128/330
2044684 10/1980 United Kingdom ................ 128/330

Primary Examiner—Robert A. Hafer
Assistant Examiner—Chris Coppens
Attorney, Agent, or Firm—Jacobson & Johnson

[57] ABSTRACT

An improved animal ear tag applicator in which the jaws include a pivotal holding member and a tapered pin with the handles having a spacing that lessens hand fatigue when applying tags to the ears of animals.

5 Claims, 6 Drawing Figures

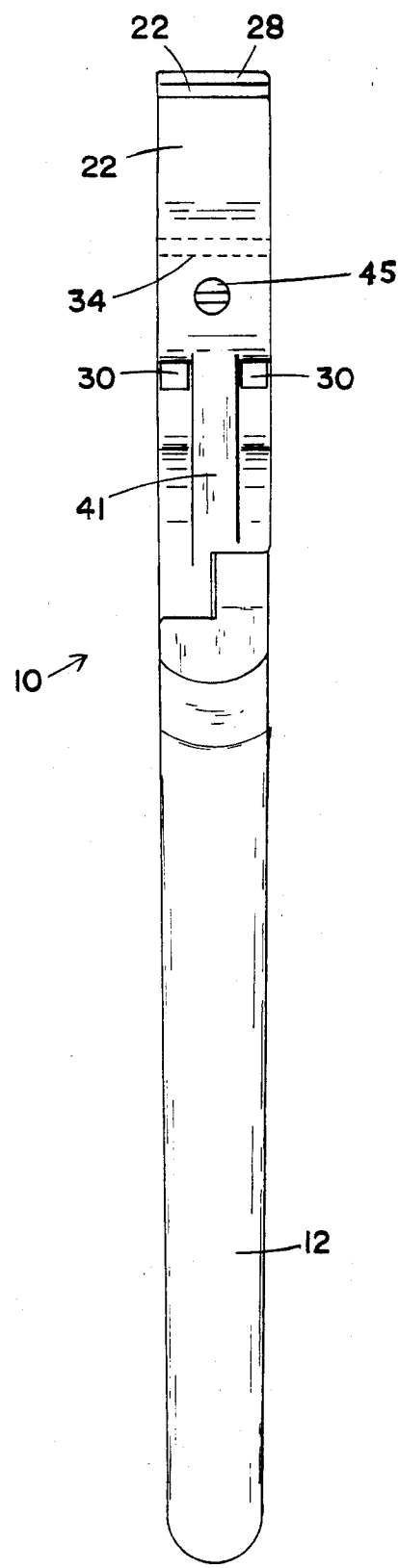
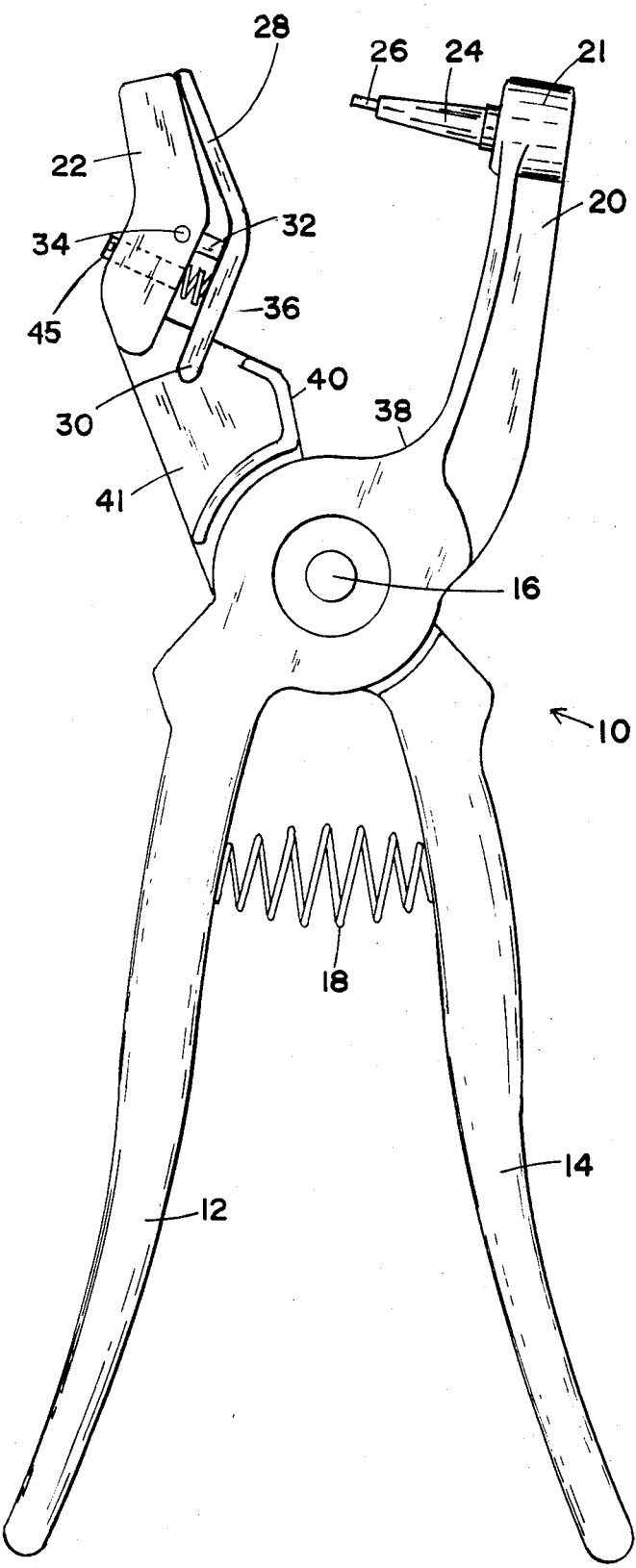
FIG. 2
FIG. 1

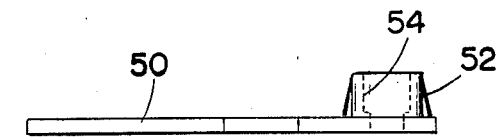
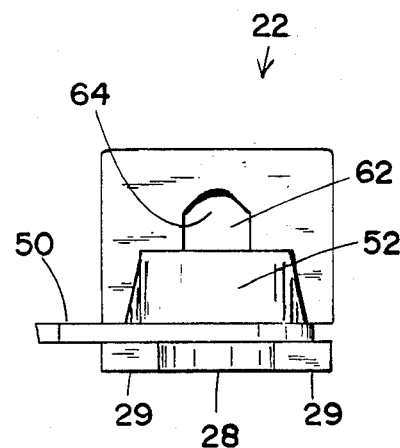
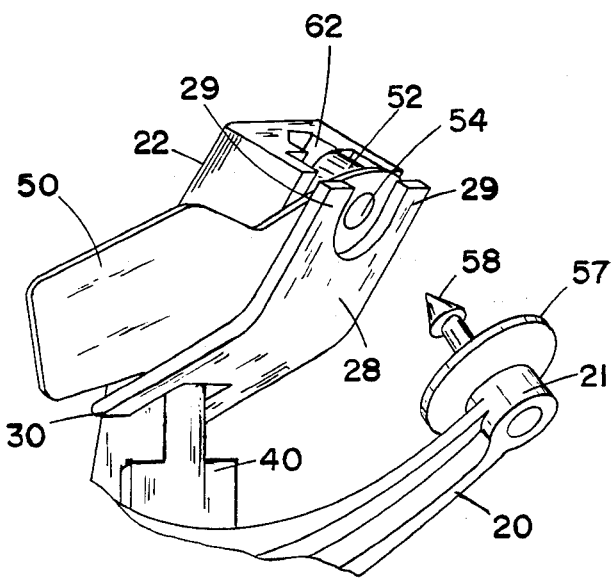
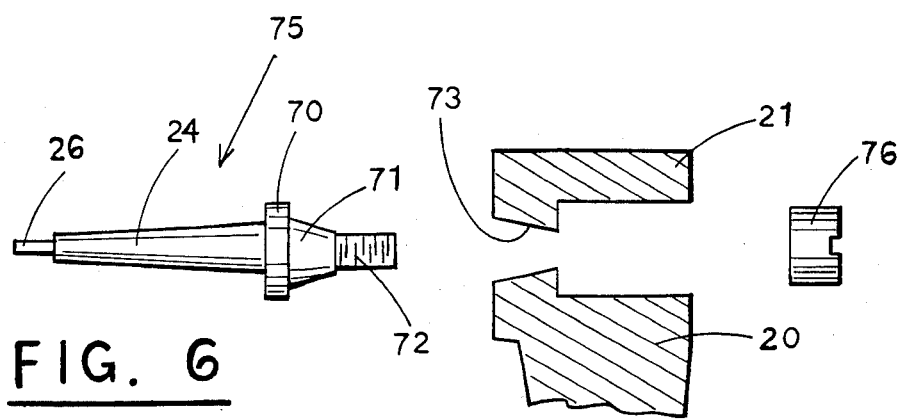

EAR TAG APPLICATORS

FIELD OF THE INVENTION

This invention relates generally to ear tag applicators and, more specifically, to improvements in arc-type ear tag applicators.

DESCRIPTION OF THE PRIOR ART

The concept of applicators for ear tags is well known and generally comprises two types of applicators. The arc-type pliers-like apparatus for applying a tag to the animal's ear. One such applicator is shown in Murphy, et al. U.S. Pat. No. 3,812,859 which is typical of the prior art arc-type pliers. A second type of applicator is the type of applicator having pivoting levers with a pin sliding within the confines of the housing so that the pin of the applicator follows a straight line during the application process. Still other pliers-like applicators are shown in copies of the brochures submitted herewith. One of the pliers sold as an ear tag applicator is a modified variation of the popular "vise grip" pliers. A disadvantage of the prior art pliers is that the user's hand quickly becomes fatigued if a large number of tags are to be applied. In addition, another problem with arc-type pliers is that the pins on the pliers may break during the assembly process necessitating the operator to stop to insert replacement pins into the pliers. In fact, the problem is so troublesome some manufacturers send extra pins with each pliers. The present invention provides an improved plier which has a greater handling comfort and greater durability so that pin breakage is virtually eliminated.

BRIEF SUMMARY OF THE INVENTION

Briefly, the invention comprises an improved arc-type applicator having a tapered pin on one jaw for holding portions of a tag in position to be inserted through an animal's ear and a narrow necked adjustable holding member for holding a further portion of the tag on the second jaw with the pliers being characterized by having handles that are spaced sufficiently close together so that when the operator grasps the pliers the phalange region of the fingers adjacent the palm of the hand and the thumb can be used to apply the force to insert the tag through the animal's ear.

BRIEF DESCRIPTION OF THE DRAWING

FIG. 1 is a front view of the applicator;

FIG. 2 is a side view of the applicator;

FIG. 3 shows a typical two-piece ear tag to be applied by the applicator;

FIG. 4 shows a top view of one of the ends of the jaws of the applicator;

FIG. 5 shows a perspective view of the two jaws of the applicator with a two-piece tag held on the jaws of the applicator; and FIG. 6 shows a detail view of the pin.

DESCRIPTION OF THE PREFERRED EMBODIMENT

Referring to FIG. 1, reference numeral 10 designates the improved applicator of the present invention which is used to apply two-piece ear tags to an animal's ear. The applicator comprises a pliers having a pair of handles 12 and 14 and a compression spring 18 which provides a force to hold the handles 12 and 14 in a normally open position as shown in FIG. 1.

One of the features of the handles of the present invention is that they comfortably permit the user to go through three discrete displacements and forces to produce insertion of an animal ear tag into the animal's ear. The first displacement with relatively little force on the handles is the closing of the jaws until the ear tag comes into contact with the ear. In the second displacement or pentration step the force on the handles must be increased sufficiently to force the ear tag impaler tip through the animal's ear. The third displacement stop or assembly stage occurs as the force on the handles is maintained and then lessened as the head of the impaler is forced through a small opening in the ear tag to thereby fasten the two-piece ear tag into a single unit. Consequently, in the application process the user must be able to generate the greater force during steps two and three. To achieve the greatest force during stages two and three with the least discomfort to the user's hand it has been found that the handles should have sufficient spacing so the region of the user's hand between the region of the phalange adjacent the palm of the hand and the opposing thumb are able to apply pressure to the handles to produce the squeezing action for steps two and three. Consequently, one feature of the invention is that the handle spacing is characterized so that the user can grasp the handles so that the greatest forces can be applied during the penetrating and assembly steps. This spacing occurs when one of the plier handles can be placed adjacent a user's thumb and the other handle is in contact with the farthermost portion of phalanges region that is adjacent the palm of the hand. With this spacing my handle spacing is such that an operator can grasp the handle and comfortably apply the necessary force during step two and step three to quickly and efficiently insert the tag into the animal's ear.

In order to provide for variations in the size of user hands, I have a slight outward curve on my handles 12 and 14 which permits the operator to position the handle of the pliers 10 until the handles feel comfortable as well as to provide a natural cupping action to prevent the hand from slipping off the plier handles. Generally, I have found if the pliers feel comfortable in the user's hand, it not only enables the user to more easily maneuver the pliers and the ear tag for insertion into the animal's ear. In addition, the user can apply a large number of tags without the hand becoming fatigued.

To provide the lever action for my pliers a pivot pin 16 extends through the pliers and forms a pivot point about which jaws 20 and 22 can be squeezed together. Located on jaw 20 is a head 21 having a tapered pin 24 for supporting and stiffening the flexible shaft on a flexible shaft tag and a penetrating and alignment tip 26 for engaging the interior recess of the hard conical spike of a two-piece tag. The tapered pin 24 has been found beneficial in that it virtually eliminates the problem of pin breakage during the tag application process. That is, oftentimes the animal may move as the tag is being applied, thus increasing side forces in the pin which may force a straight pin out of alignment causng the pin to bend or break under the forces of application. The tapered pin has been found to have the strength to withstand the side forces encountered in the application process. Although other suitable materials could be used, a preferred material for tapered pin 24 is stainless steel. In addition, the tapered pin 24 has been found to provide a quicker release from the tag than the prior art cylindrical pins. That is, once pin 24 has forced the impaler through the animal's ear only a slight rearward motion of jaw 20 and pin 24 is sufficient to disengage the frictional contact of pin 24 with the interior of the flexible shank of the ear tag spike having a tapered interior whereas with a cylindrical pin and flexible shanks one must displace the pin completely out of the shank before disengagement occurs. Thus, the tapered pin has been found advantageous since it allows one to quickly remove the applicator from the animal once the tag has been inserted into the animal's ear.

In order to provide an applicator that is easy to handle, applicator 10 is comprised of a lightweight alloy to keep the weight of the pliers as low as possible since it has been found that a hand will fatigue much faster if the pliers is heavy and has a larger mass located outside the hand area. In addition, pliers with large masses outside the hand area are more difficult to insert into an animal's ear since they are clumsier to use. Thus, in the present invention the greatest mass is in the handles rather than in the jaws.

A further feature of the pliers of the present invention is that where the moving parts of the pliers 10 come together the junction is spaced sufficiently far apart so as not to pinch either the fingers of the user or other portions of an animal's ear during the tag application process. Note the wide opening denoted by throat section 38 on jaw 20 and throat section 40 on jaw 22 as well as the wide openings located around pivot pin 16. Thus, the present invention is characterized that the movable handles and jaw sections located around the pivot pin 16 are sufficiently spaced apart so that whether the pliers is in the open or closed position the pliers cannot accidentially squeeze or pinch either an animal's ear or the applicator's hand during the tag application process.

Located on jaw 22 is a holding member for holding a portion of the two-piece tag in position to be fastened to an animal's ear. Member 28 is pivotally mounted about pivot pin 34 through a narrow member 32 which permits a portion of an animal's ear tag to be inserted under the member in the opposite side of pivot pin 34 and a compression spring 36 that provides the force to hold member 28 in contact with jaw 22.

Located on jaw 22 is a set screw 45 which can be screwed in or out to adjust the tension on compression spring 36. That is, in order to have the top portion 28 have a greater holding force one compresses spring 36 inward to produce a greater holding force and, similarly, as one moves screw 45 outward one decreases the compression force on spring 36 thus decreasing the holding force of jaw 22. This feature enables the operator to select the proper holding force for the tag being applied since certain tags may require less holding force than others. In addition, member 28 through application of the holding force permits the operator to rotate the tag to a desired position.

In order for an operator to open member 28 to insert a tag therein, the operator pushes on either of members 30 to pivot the end of member 28 away from jaw 22 and thus permit insertion of one portion of a tag between jaw 22 and member 28. To illustrate how a tag can be mounted in the jaw of pliers 10 reference should be made to FIGS. 3, 4 and 5. The two-piece tag is shown in FIG. 3 in which one portion of a two-piece tag 60 includes a base 57, a tapered stem 56 and a hard conical tip 58 for piercing an animal's ear. The second portion of the two-piece tag comprises an indicating indicia area 50 having a tapered head 52 with a recess 54 for receiving the conical tip 58. A tag of this type is more fully shown and described in U.S. Pat. No. 4,209,924.

FIG. 4 and FIG. 5 show how the second portion of the two-piece tag is mounted in upper jaw 25 with lips 29 extending around the opening in the base of the tag with head 52 located in the alignment recess 60 in jaw 22. Note in FIG. 5 that region 50 of the second portion of the tag is folded downward to be at an angle of less than 90° with respect to jaw 22 and preferably at an angle of 30° or less. This feature of having the tag at an angle of 30° or less to the jaw allows the tag to present the smallest possible profile when the jaw and tag are inserted into the animal's ear, thus enabling the operator to have an unobstructed view of the area of the ear where the tag is to be applied. As can be seen in FIG. 5, the second portion of the two-piece tag is in a position ready to be assembled to the first portion of the two-piece tag having base 57 with a conical tip 58 mounted on stud 24. During the application process jaw 20 and 22 are brought or squeezed together until conical tip 58 pierces the animal's ear and passes through the opening in head 52.

FIG. 4 shows a top view of jaw 22 showing one portion of the tag being held in place by lips 29 on member 28 with tapered base or head 52 located in tapered recess 60 provided in jaw 22. In the preferred embodiment base 52 has a taper of approximately 10° or less and the recess 60 has a mating taper 10° or less so that base 52 can quickly align itself with recess 60. The feature of mating frusto conical surfaces also permits quick release of base 52 from recess 60 since a slight rearward displacement of base 52 breaks the surface contact between the mating surface of base 52 and recess 60 thus permitting quick withdrawal. Located on the backside of jaw 22 is an opening 62 and a blunting base 64 for blunting the end of the hard conical tip. That is, tip 58 needs to be sharp to pierce the animal's ear; however, once the animal's ear is pierced the tip can be dulled to prevent injury to the same animal or other animals who may come in contact with the exposed tip. The blunting of the tip occurs in the third stage as the popping motion of the impaler carriers tip 58 through the opening in the second portion of the tag to cause tip 58 to stop on blunting area 64. As tip 58 hits blunting area 64 it blunts the sharp tip 58 and simultaneously prevents further penetration of tip 50 to prevent unnecessary squeezing or bruising of the animal's ear. The elimination of the unnecessary squeezing of the animal's ear has been found to minimize tissue damage to the area of the ear around the opening formed in the ear and thus permits faster healing.

In another feature of our invention we have made the depth of the throat of sufficient depth so that the distance from the pin to the surface between throat 38 and 40 is sufficiently deep to allow penetration deep into the animal's ear if the tag and applicators are inserted lengthwise into the animal's ear. For most animals a throat depth of 2 inches or more is sufficient to enable the tag to be inserted to the proper depth when the applicator is inserted lengthwise into the ear.

Referring to FIG. 6 the detail of pin 75 is shown with tip 26 and taper 24 for engaging the spike of the ear tag and a retaining shoulder 70 for supporting the base of the spike. Located to the right of retaining shoulder 70 is a tapered neck 71 that mates with tapered opening 73 in jaw 20. Typically, the taper on both jaw 20 and pin 75 is on the order of 5° or less. Located on the end of the pin 75 and adjacent to tapered neck 71 is a threaded section 72 that permits an operator to pull tapered neck 71 into frictional engagement with the tapered recess 73 in jaw 20 through tightening of nut 76. It has been discovered that this type of mating engagement of pin 75 in jaw 20 virtually eliminates the problems of pins coming loose from the jaw. That is, in prior art applicators the pins oftentimes will work loose. If the operator unknowingly attempts to apply a tag with a loose pin, there is usually sufficient misalignment to break or bend the pin. With the present invention the tapered neck 71 forms an interfitting fit with the tapered recess 73 in jaw 20 and the continued application of pressure from application of each tag insures that tapered neck 71 remains in frictional engagement with tapered mating recess 73 in jaw 20. Consequently, should nut 76 which holds pin 75 to the jaw 20 work loose, the frictional engagement between tapered neck 71 and the tapered recess 73 will hold pin 75 in position in jaw 20. A further advantage is that the interlocking taper fit also prevents rotation of pin 75 thus insuring that the chances of nut 76 working its way loose are remote. Thus, the applicator permits replacement of pin 75 by use of a removable fastener yet the advantage of a permanently mounted pin is obtained through the locking action that produces an interference fit between pin 75 and jaw 20. A further advantage is that by use of mating tapered pin 75 and jaw 20 is that one can always be sure pin 75 is aligned with respect to the opposite jaw as long as the pliers are made to proper dimensions.

I claim:

1. An applicator for applying a first portion of an ear tag having a sharp point to the ear of an animal comprising:
   a first jaw having means for holding the first portion of an ear tag having a sharp point for piercing through the ear of an animal;
   a second jaw, said second jaw having a blunting area for blunting the sharp point on the first portion of the ear tag, said second jaw having an angled pivotal member for holding a second portion of an ear tag, said angled pivotal member having means thereon for holding the second portion of an ear tag in said second jaw and said angled pivotal member being spaced a distance from said second jaw so that a channel large enough to accomodate a portion of said second portion of an ear tag is formed between said second jaw and said angled pivotal member for holding the second portion of an ear tag in a bent position along said second jaw to thereby permit said second jaw and said second portion of an ear tag to be inserted into the ear of an animal;
   means for opening and closing said first jaw and said second jaw, said first jaw and said second jaw having an open position so that the ear of an animal can be inserted between said first jaw and said second jaw;
   said first jaw and said second jaw having a closed position so that when said first jaw and said second jaw are moved from the open position to the closed position said means for holding the first portion of an ear tag forces the sharp point of the first portion of the ear tag through the animal's ear and into the blunting area to thereby stop further penetration of the ear tag and to blunt the sharp point of the ear tag.

2. An applicator, said applicator having an open and closed position and when moved from the open position to the closed position the application is operable for applying an ear tag inside the ear of an animal comprising:
   a first jaw having means for holding a first portion of an ear tag having means for piercing an animal's ear;
   a second jaw having further means for holding a second portion of an ear tag, said second jaw having an angled pivotal member spaced a distance from said second jaw so that a channel large enough to accommodate a portion of said second portion of an ear tag is formed between said second jaw and said angled pivotal member for holding the second portion of an ear tag in an bent position along said jaw to thereby permit insertion of the second portion of an ear tag inside the ear of an animal;
   said first jaw and said second jaw having an open position and a closed position so that when said first jaw and said second jaw are moved from the open position to the closed position said means for holding a first portion of an ear tag forces the means for piercing an animal's ear through the animal's ear;
   said first jaw and said second jaw spaced apart so that when said first jaw and said second jaw are in a closed position said first and said second jaw are spaced sufficiently far apart so as not to pinch the ear of the animal in which the ear tag is being applied; and
   closure means for forcing said first jaw and said second jaw from the open position to the closed position.

3. The invention of claim 2 wherein said tag holding member is sufficiently narrow so that the portion of the tag attaches and extends at an angle of 30° or less in a direction toward the pivot pin of said applicator.

4. The invention of claim 2 wherein said means for holding a first portion of an ear tag comprises a pin having means for forming frictional engagement with said first jaw to permit locking engagement of said pin with said first jaw.

5. The invention of claim 4 wherein said means for forming frictional engagement with said first jaw comprises a tapered neck and said first jaw includes a tapered recess so that the force of applying an ear tag forces said tapered neck into further frictional engagement with said tapered recess.

* * * * *